(12) United States Patent
Kawasaki et al.

(10) Patent No.: US 8,784,976 B2
(45) Date of Patent: *Jul. 22, 2014

(54) LAMINATED POLYESTER FILM

(75) Inventors: Taishi Kawasaki, Shiga-ken (JP); Masato Fujita, Shiga-ken (JP)

(73) Assignee: Mitsubishi Plastics, Inc., Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 13/395,512

(22) PCT Filed: Sep. 13, 2010

(86) PCT No.: PCT/JP2010/065754
§ 371 (c)(1),
(2), (4) Date: Apr. 5, 2012

(87) PCT Pub. No.: WO2011/037032
PCT Pub. Date: Mar. 31, 2011

(65) Prior Publication Data
US 2012/0189831 A1 Jul. 26, 2012

(30) Foreign Application Priority Data

Sep. 23, 2009 (JP) ................. 2009-218298
Sep. 23, 2009 (JP) ................. 2009-218299
Sep. 28, 2009 (JP) ................. 2009-221782

(51) Int. Cl.
*B32B 7/02* (2006.01)
(52) U.S. Cl.
USPC ............................ 428/212; 428/216; 428/483
(58) Field of Classification Search
USPC .......................................... 428/212, 216, 483
See application file for complete search history.

(56) References Cited

U.S. PATENT DOCUMENTS 6,793,860 B2 * 9/2004 Xing et al. ................. 264/176.1
2009/0086318 A1 4/2009 Yaegashi et al.

FOREIGN PATENT DOCUMENTS

| JP | 2002-6107 | 1/2002 |
|---|---|---|
| JP | 2005-189741 | 7/2005 |
| JP | 2006-169496 | 6/2006 |
| JP | 2006-253565 | 9/2006 |
| JP | 2007-171707 | 7/2007 |
| JP | 2008-18543 | 1/2008 |
| JP | 2009-98623 | 5/2009 |
| WO | WO 2009/072469 | 6/2009 |

OTHER PUBLICATIONS

Kubo et al (JP 2004-054160), Feb. 19, 2004.*
International Search Report for PCT/JP2010/065754, mailed Nov. 30, 2010.

* cited by examiner

*Primary Examiner* — Aaron Austin
*Assistant Examiner* — Lawrence Ferguson
(74) *Attorney, Agent, or Firm* — Nixon & Vanderhye P.C.

(57) ABSTRACT

The present invention provides a laminated polyester film which exhibits a good adhesion property to various adhesives, and can be suitably used in the applications in which a high total light transmittance is required, for example, as a member for protecting a polarizing plate of liquid crystal displays, in particularly, as a protective film disposed on a rear surface of a rear side polarizing plate. The laminated polyester film according to the present invention comprises a polyester film; a coating layer formed by applying a coating solution which comprises at least one resin selected from the group consisting of a polyester resin, an acrylic resin and a urethane resin, polyvinyl alcohol and an oxazoline compound, on one surface of the polyester film; and a coating layer formed on the other surface of the polyester film which has an absolute reflectance exhibiting one minimum value in a wavelength range of 300 to 800 nm wherein the minimum value is not more than 3.5%.

19 Claims, No Drawings

LAMINATED POLYESTER FILM

This application is the U.S. national phase of International Application No. PCT/JP2010/065754, filed 13 Sep. 2010, which designated the U.S. and claims priority to Japan Application No. 2009-218298, filed 23 Sep. 2009; Japan Application No. 2009-218299, filed 23 Sep. 2009; and Japan Application No. 2009-221782, filed 28 Sep. 2009, the entire contents of each of which are hereby incorporated by reference.

TECHNICAL FIELD

The present invention relates to a laminated polyester film, and more particularly, to a laminated polyester film which can be suitably used as a member for protecting a polarizing plate employed in liquid crystal displays.

BACKGROUND ART

In recent years, liquid crystal displays have been extensively used as a display device for TVs, personal computers, digital cameras, cellular phones, etc. The liquid crystal displays have a construction of "front side polarizing plate// liquid crystal//rear side polarizing plate" when viewed from a display side as the front side towards its opposite side (as a backlight side). The polarizing plate used in the liquid crystal displays is usually constructed of a polarizing film in the form of a dyed monoaxially stretched polyvinyl alcohol film, and protective films, etc., attached onto the polarizing film (protective film/polarizing film/protective film). A whole construction of the liquid crystal displays including a protective film A and a protective film B which are disposed on front and rear surfaces of the polarizing film constituting the front side polarizing plate as well as a protective film C and a protective film D which are disposed on front and rear surfaces of the polarizing film constituting the rear side polarizing plate is "protective film A//front side polarizing film//protective film B//liquid crystal//protective film C//rear side polarizing film// protective film D" when viewed from the front side.

As the protective films, a triacetyl cellulose film (hereinafter occasionally referred to merely as a "TAC film") has been frequently used because of a high transparency and a good optical isotropy thereof. However, the TAC film tends to be deteriorated in dimensional stability and wet heat resistance, and further tends to have such a problem that the surface of the TAC film must be previously subjected to saponification treatment with an alkali solution before adhering to the polarizing film. With the recent tendency toward increase in size and quality of liquid crystal displays, there is an increasing demand for high mechanical strength of these films as well as stability thereof under high-temperature and high-humidity conditions. In addition, it has been required to prevent deterioration in quality of the films owing to bleed-out of low-molecular weight materials and increased haze when subjected to the alkali treatment. Further, the alkali treatment using a high-concentration alkali solution tends to be undesirable in view of working safety and environmental protection.

To solve these conventional problems, various materials other than the TAC films such as norbornene-based films have been proposed (Patent Documents 1 and 2). However, these other material films using no ordinary resins are expensive owing to high production costs. In consequence, there has been proposed the method using a film of polyesters as ordinary resins which are capable of ensuring a good dimensional stability and free from the alkali treatments causing various problems, and further are advantageous in view of costs.

However, the polyester films by themselves tend to have problems such as deteriorated adhesion property to adhesives used for bonding the polarizing film and the protective film, and a low total light transmittance as compared to that of the TAC films, resulting in a low brightness of a polarizing plate obtained using the polyester films. In order to enhance an adhesion property of the polyester film, there have been proposed the layer constructions in which an anchor layer is provided. However, in any of these proposed conventional constructions, no specific embodiments have been disclosed, so that it may be difficult to ensure a sufficient adhesion property of the film if an unsuitable adhesive is used therefor (Patent Documents 3 to 5).

PRIOR ARTS

Patent Documents

Patent Document 1: Japanese Patent Application Laid-Open (KOKAI) No. 6-51117
Patent Document 2: Japanese Patent Application Laid-Open (KOKAI) No. 2006-227090
Patent Document 3: Japanese Patent Application Laid-Open (KOKAI) No. 2002-116320
Patent Document 4: Japanese Patent Application Laid-Open (KOKAI) No. 8-271733
Patent Document 5: Japanese Patent Application Laid-Open (KOKAI) No. 8-271734

SUMMARY OF THE INVENTION

Problems to be Solved by the Invention

The present invention has been accomplished to solve the above conventional problems. An object of the present invention is to solve various problems of the TAC film, and provide a laminated polyester film which exhibits a good adhesion property to adhesives and a high total light transmittance, and can be suitably used as a protective film for polarizing films, in particular, a protective film for protecting a rear surface of a rear side polarizing plate (corresponding to the above protective film D).

Means for Solving Problems

As a result of the present inventors' earnest study in view of the above problems, it has been found that these problems can be readily solved by using a laminated polyester film having a specific structure. The present invention has been attained on the basis of this finding.

That is, in an aspect of the present invention, there is provided a laminated polyester film comprising
 a polyester film;
 a first coating layer formed by applying a coating solution which comprises polyvinyl alcohol, an oxazoline compound and at least one resin selected from the group consisting of a polyester resin, an acrylic resin and a urethane resin on one surface of the polyester film; and
 a second coating layer formed on the other surface of the polyester film which has an absolute reflectance exhibiting one minimum value in a wavelength range of 300 to 800 nm, which minimum value is not more than 3.5%.

Effect of the Invention

In accordance with the present invention, there can be provided a laminated polyester film which has a good adhesion property to adhesives for bonding a polarizing film thereto, for example, when used as a protective film for polarizing plates, in particular, as a protective film disposed on a rear surface of a rear side polarizing plate, and is excellent in total light transmittance of a polarizing plate formed therefrom. Therefore, the present invention has a high industrial value.

PREFERRED EMBODIMENTS FOR CARRYING OUT THE INVENTION

The present invention is described in more detail below.

The polyester film constituting the laminated polyester film of the present invention may have either a single layer structure or a multilayer structure. Unless departing from the scope of the present invention, the polyester film may have not only a two or three layer structure but also a four or more multilayer structure, and the layer structure of the polyester film is not particularly limited.

The polyester used in the present invention may be either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned at least one compound selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned at least one compound selected from the group consisting of ethylene glycol, diethylene glycol, propylene glycol, butanediol, 4-cyclohexanedimethanol and neopentyl glycol.

The polyester film used in the present invention may preferably comprise an ultraviolet absorber in order to prevent a liquid crystal or the like in the liquid crystal displays from being deteriorated owing to irradiation with an ultraviolet ray. The ultraviolet absorber is not particularly limited as long as it is a compound having a capability of absorbing an ultraviolet ray and can withstand heat applied during a process for producing the polyester film.

As the ultraviolet absorber, there are generally known an organic ultraviolet absorber and an inorganic ultraviolet absorber. In view of a good transparency, among these ultraviolet absorbers, the organic ultraviolet absorber is preferred. Examples of the organic ultraviolet absorber include, but are not particularly limited to, benzotriazole-based ultraviolet absorbers, cyclic iminoester-based ultraviolet absorbers and benzophenone-based ultraviolet absorbers. Among these organic ultraviolet absorbers, benzotriazole-based ultraviolet absorbers and cyclic iminoester-based ultraviolet absorbers are preferred in view of a good durability. These ultraviolet absorbers may be used in combination of any two or more thereof.

Specific examples of the benzotriazole-based ultraviolet absorbers include, but are not particularly limited to, 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl]-2H-benzotriazole, 2-[2'-hydroxy-3'-tert-butyl-5'-(methacryloyloxyethyl)phenyl]-2H-benzotriazole, 2-[2'-hydroxy-5'-tert-butyl-3'-(methacryloyloxyethyl)phenyl]-2H-benzotriazole, 2-[2'-hydroxy-5'-(methacryloyloxyethyl)phenyl]-5-chloro-2H-benzotriazole, 2-[2'-hydroxy-5'-(methacryloyloxyethyl)phenyl]-5-methoxy-2H-benzotriazole, 2-[2'-hydroxy-5'-(methacryloyloxyethyl)phenyl]-5-cyano-2H-benzotriazole, 2-[2'-hydroxy-5'-(methacryloyloxyethyl)phenyl]-5-tert-butyl-2H-benzotriazole and 2-[2'-hydroxy-5'-(methacryloyloxyethyl)phenyl]-5-nitro-2H-benzotriazole.

Specific examples of the cyclic iminoester-based ultraviolet absorbers include, but are not particularly limited to, 2-methyl-3,1-benzoxazin-4-one, 2-butyl-3,1-benzoxazin-4-one, 2-phenyl-3,1-benzoxazin-4-one, 2-(1- or 2-naphthyl)-3,1-benzoxazin-4-one, 2-(4-biphenyl)-3,1-benzoxazin-4-one, 2-p-nitrophenyl-3,1-benzoxazin-4-one, 2-m-nitrophenyl-3,1-benzoxazin-4-one, 2-p-benzoylphenyl-3,1-benzoxazin-4-one, 2-p-methoxyphenyl-3,1-benzoxazin-4-one, 2-o-methoxyphenyl-3,1-benzoxazin-4-one, 2-cyclohexyl-3,1-benzoxazin-4-one, 2-p-(or m-)phthalimidophenyl-3,1-benzoxazin-4-one, N-phenyl-4-(3,1-benzoxazin-4-on-2-yl)phthalimide, N-benzoyl-4-(3,1-benzoxazin-4-on-2-yl)aniline, N-benzoyl-N-methyl-4-(3,1-benzoxazin-4-on-2-yl)aniline, 2-(p-(N-methylcarbonyl)phenyl-3,1-benzoxazin-4-one, 2,2'-bis(3,1-benzoxazin-4-one), 2,2'-ethylene-bis(3,1-benzoxazin-4-one), 2,2'-tetramethylene-bis(3,1-benzoxazin-4-one), 2,2'-decamethylene-bis(3,1-benzoxazin-4-one), 2,2'-p-phenylene-bis(3,1-benzoxazin-4-one), 2,2'-m-phenylene-bis(3,1-benzoxazin-4-one), 2,2'-(4,4'-diphenylene)bis(3,1-benzoxazin-4-one), 2,2'-(2,6- or 1,5-naphthylene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), 2,2'-(2-chloro-p-phenylene)bis(3,1-benzoxazin-4-one), 2,2'-(1,4-cyclohexylene)bis(3,1-benzoxazin-4-one), 1,3,5-tri(3,1-benzoxazin-4-on-2-yl)benzene, 1,3,5-tri(3,1-benzoxazin-4-on-2-yl)naphthalene, 2,4,6-tri(3,1-benzoxazin-4-on-2-yl)naphthalene, 2,8-dimethyl-4H,6H-benzo(1,2-d; 5,4-d')bis(1,3)-oxazin-4,6-dione, 2,7-dimethyl-4H,9H-benzo(1,2-d; 4,5-d')bis(1,3)-oxazin-4,9-dione, 2,8-diphenyl-4H,8H-benzo(1,2-d; 5,4-d')bis(1,3)-oxazin-4,6-dione, 2,7-diphenyl-4H,9H-benzo(1,2-d; 4,5-d')bis(1,3)-oxazin-4,6-dione, 6,6'-bis(2-methyl-4H,3,1-benzoxazin-4-one), 6,6'-bis(2-ethyl-4H,3,1-benzoxazin-4-one), 6,6'-bis(2-phenyl-4H,3,1-benzoxazin-4-one), 6,6'-methylene-bis(2-methyl-4H,3,1-benzoxazin-4-one), 6,6'-methylene-bis(2-phenyl-4H,3,1-benzoxazin-4-one), 6,6'-ethylene-bis(2-methyl-4H,3,1-benzoxazin-4-one), 6,6'-ethylene-bis(2-phenyl-4H,3,1-benzoxazin-4-one), 6,6'-butylene-bis(2-methyl-4H,3,1-benzoxazin-4-one), 6,6'-butylene-bis(2-phenyl-4H,3,1-benzoxazin-4-one), 6,6'-oxy-bis(2-methyl-4H,3,1-benzoxazin-4-one), 6,6'-oxy-bis(2-phenyl-4H,3,1-benzoxazin-4-one), 6,6'-sulfonyl-bis(2-methyl-4H,3,1-benzoxazin-4-one), 6,6'-sulfonyl-bis(2-phenyl-4H,3,1-benzoxazin-4-one), 6,6'-carbonyl-bis(2-methyl-4H,3,1-benzoxazin-4-one), 6,6'-carbonyl-bis(2-phenyl-4H,3,1-benzoxazin-4-one), 7,7'-methylene-bis(2-methyl-4H,3,1-benzoxazin-4-one), 7,7'-methylene-bis(2-phenyl-4H,3,1-benzoxazin-4-one), 7,7'-bis(2-methyl-4H,3,1-benzoxazin-4-one), 7,7'-ethylene-bis(2-methyl-4H,3,1-benzoxazin-4-one), 7,7'-oxy-bis(2-methyl-4H,3,1-benzoxazin-4-one), 7,7'-sulfonyl-bis(2-methyl-4H,3,1-benzoxazin-4-one), 7,7'-carbonyl-bis(2-methyl-4H,3,1-benzoxazin-4-one), 6,7'-bis(2-methyl-4H,3,1-benzoxazin-4-one), 6,7'-bis(2-phenyl-4H,3,1-benzoxazin-4-one), 6,7'-methylene-bis(2-methyl-4H,3,1-benzoxazin-4-one) and 6,7'-methylene-bis(2-phenyl-4H,3,1-benzoxazin-4-one).

Among the above compounds, in view of a good hue, the benzoxazinone-based compounds are preferably used because they are hardly colored yellowish. Examples of the suitable benzoxazinone-based compounds include those compounds represented by the following general formula (1).

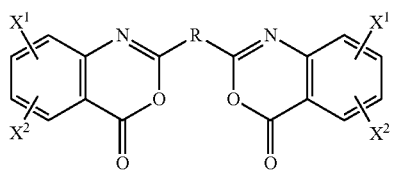

(1)

In the above general formula, R is a divalent aromatic hydrocarbon group; and $X^1$ and $X^2$ are each independently hydrogen or a group selected from the following functional groups, although not particularly limited thereto.

Examples of the functional groups include an alkyl group, an aryl group, a heteroaryl group, halogen, an alkoxy group, an aryloxy group, a hydroxyl group, a carboxyl group, an ester group and a nitro group.

In the present invention, among the compounds represented by the above structural formula, 2,2'-(1,4-phenylene)bis[4H-3,1-benzoxazin-4-one] is especially preferred.

The amount of the ultraviolet absorber compounded in the laminated polyester film of the present invention is usually not more than 10.0% by weight, and preferably in the range of 0.3 to 3.0% by weight. When the amount of the ultraviolet absorber compounded is more than 10.0% by weight, the ultraviolet absorber tends to suffer from bleeding-out onto the surface of the laminated polyester film, which tends to result in deterioration in surface functionality such as deterioration in adhesion property, etc.

The film in the form of a multilayer film preferably has at least three layers structure. In this case, the ultraviolet absorber is preferably compounded in an intermediate layer thereof. By compounding the ultraviolet absorber in the intermediate layer, the compound can be prevented from being bled out onto the surface of the film, so that the resulting film can maintain its properties such as adhesion property.

The laminated polyester film of the present invention preferably has a light transmittance of not more than 10% and more preferably not more than 5% as measured at a wavelength of 380 nm for the purpose of preventing deterioration of liquid crystal owing to irradiation with an ultraviolet ray when the laminated polyester film is used as a protective film for polarizing films. The light transmittance of the laminated polyester film as measured at a wavelength of 380 nm may be controlled by varying the kind and amount of the above ultraviolet absorber used therein.

For the purpose of mainly imparting an easy-slipping property to the film and preventing occurrence of flaws in the film during the respective steps, particles are preferably compounded in the polyester layer in the film of the present invention. The kinds of particles to be compounded in the polyester layer are not particularly limited as long as the particles are capable of imparting a good easy-slipping property to the film. Specific examples of the particles include particles of silica, calcium carbonate, magnesium carbonate, barium carbonate, calcium sulfate, calcium phosphate, magnesium phosphate, kaolin, aluminum oxide, titanium oxide, etc. In addition, there may also be used heat-resistant organic particles as described in Japanese Patent Publication (KOKOKU) No. 59-5216, Japanese Patent Application Laid-Open (KOKAI) No. 59-217755 or the like. Examples of the other heat-resistant organic particles include particles of thermosetting urea resins, thermosetting phenol resins, thermosetting epoxy resins, benzoguanamine resins, etc. Further, there may also be used deposited particles obtained by precipitating and finely dispersing a part of metal compounds such as a catalyst during the process for production of the polyester.

On the other hand, the shape of the particles used above is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The average particle diameter of the particles used above is usually in the range of 0.01 to 5 µm and preferably 0.1 to 3 µm. When the average particle diameter of the particles is less than 0.01 µm, the particles may fail to impart a sufficient easy-slipping property to the polyester layer, or tend to be aggregated together and therefore exhibit a poor dispersibility, which will cause deterioration in transparency of the resulting film. On the other hand, when the average particle diameter of the particles is more than 5 µm, the surface roughness of the obtained film tends to be too coarse, so that there tend to occur problems when forming functional layers thereon in the subsequent steps.

The content of the particles in the polyester layer is usually in the range of 0.0001 to 5% by weight and preferably 0.0003 to 3% by weight. When the content of the particles in the polyester layer is less than 0.0001% by weight, the resulting film tends to be insufficient in easy-slipping property. On the other hand, when the content of the particles in the polyester layer is more than 5% by weight, the resulting film tends to be insufficient in transparency.

The method of adding the particles to the polyester layer is not particularly limited, and any conventionally known methods can be suitably used therefor. For example, the particles may be added at any optional stages in the process for production of the polyester forming the respective layers. The particles are preferably added to the polyester after completion of the esterification reaction or transesterification reaction.

In addition, there may also be used the method of blending a slurry of the particles prepared by dispersing the particles in ethylene glycol or water with the raw polyester material using a vented kneading extruder, the method of blending the dried particles with the raw polyester material using a kneading extruder, or the like.

Meanwhile, the polyester film used in the present invention may also comprise, in addition to the above particles, conventionally known additives such as an antioxidant, an antistatic agent, a thermal stabilizer, a lubricant, a dye, a pigment, etc., if required.

The thickness of the polyester film used in the present invention is not particularly limited as long as it lies within any suitable range capable of keeping a film shape, and is usually in the range of 10 to 200 µm and preferably 25 to 50 µm.

Next, an example of the process of producing the polyester film used in the present invention is more specifically explained, although not particularly limited thereto. That is, in the production process, there is preferably used such a method in which the above-mentioned raw polyester material is extruded from a die in the form of a molten sheet, and the molten sheet is cooled and solidified on a cooling roll to obtain an unstretched sheet. In this case, in order to enhance a flatness of the sheet, it is preferred to enhance adhesion between the sheet and a rotary cooling drum. For this purpose, an electrostatic adhesion method and/or a liquid coating adhesion method are preferably used. Next, the thus obtained unstretched sheet is biaxially stretched. In such a case, the unstretched sheet is first stretched in one direction thereof using a roll-type or tenter-type stretching machine. The stretching temperature is usually 70 to 120° C. and preferably 80 to 110° C., and the stretch ratio is usually 2.5 to 7 times and preferably 3.0 to 6.0 times. Next, the thus stretched film is stretched in the direction perpendicular to the stretching direction of the first stage. In this case, the stretching temperature is usually 70 to 170° C., and the stretch ratio is usually 3.0 to 7.0 times and preferably 3.5 to 6.0 times. Successively, the resulting biaxially stretched sheet is heat-treated at a temperature of 180 to 270° C. under a tension or relaxation within 30% to obtain a biaxially stretched film. Upon the above stretching step, there may also be used the method in which the stretching in each direction is carried out in two or more stages. In such a case, the multi-stage stretching is preferably performed such that the stretch ratio in each of the two directions is finally fallen within the above-specified range.

Also, upon producing the polyester film constituting the laminated polyester film according to the present invention, there may also be used a simultaneous biaxial stretching method. The simultaneous biaxial stretching method is such a method in which the above unstretched sheet is stretched and oriented in both of the machine and width directions at the same time while maintaining the sheet in a suitable temperature-controlled condition at a temperature of usually 70 to 120° C. and preferably 80 to 110° C. The stretch ratio used in the simultaneous biaxial stretching method is 4 to 50 times, preferably 7 to 35 times and more preferably 10 to 25 times in terms of an area ratio of the film. Successively, the obtained biaxially stretched sheet is heat-treated at a temperature of 170 to 250° C. under a tension or relaxation within 30% to obtain a stretched oriented film. As the apparatus used in the above simultaneous biaxial stretching method, there may be employed those stretching apparatuses of any conventionally known type such as a screw type stretching apparatus, a pantograph type stretching apparatus and a linear drive type stretching apparatus.

Next, the method of forming the coating layers constituting the laminated polyester film according to the present invention is explained. The coating layers may be formed by either an in-line coating method in which the surface of the polyester film is subjected to coating treatment during the stretching step of the polyester film, an off-line coating method in which the polyester film produced is once transferred to an outside of the film production system and subjected to coating treatment, or combination of these methods. Among these methods, the in-line coating method is preferably used because the coating layers can be produced simultaneously with formation of the polyester film and therefore at low production costs, and the thicknesses of the coating layers can be varied by controlling a stretch ratio of the polyester film.

For example, in the case of a sequential biaxial stretching, the in-line coating treatment may be carried out, in particular, after completion of the longitudinal stretching but before initiation of the lateral stretching, although not particularly limited thereto. When the coating layers are formed on the polyester film by the in-line coating method, the coating can be carried out simultaneously with formation of the polyester film, and the coating layers can be treated at a high temperature. As a result, it is possible to produce a film suitable as the polyester film used in the present invention.

In the present invention, it is essentially required that the polyester film is provided on one surface thereof with a coating layer formed by applying a coating solution which comprises at least one resin selected from the group consisting of a polyester resin, an acrylic resin and a urethane resin, polyvinyl alcohol and an oxazoline compound, thereon (hereinafter occasionally referred to merely as a "first coating layer"), and provided on the other surface thereof with a coating layer which has an absolute reflectance exhibiting one minimum value in a wavelength range of 300 to 800 nm wherein the minimum value is not more than 3.5% (hereinafter occasionally referred to merely as a "second coating layer").

The first coating layer in the laminated polyester film of the present invention is a coating layer for enhancing an adhesion property to various functional layers, for example, may be used for enhancing an adhesion property to various adhesives used for laminating a polarizing film on the laminated polyester film according to the present invention.

As a result of the present inventors' earnest study on various compounds such as polyester resins, acrylic resins, urethane resins and polyvinyl alcohol for enhancing an adhesion property between the polyester film and an adhesive layer, it has been recognized that a coating layer formed singly from each of these resins is incapable of exhibiting any adhesion property. Also, although the adhesion property of a coating layer formed of combination of the polyester resin and polyvinyl alcohol, combination of the acrylic resin and polyvinyl alcohol or combination of the urethane resin and polyvinyl alcohol has been studied, any combination of the resins has failed to be considerably improved in adhesion property. As a result of further studies on combinations with various materials, it has been found that the combination of polyvinyl alcohol and an oxazoline compound with suitable modification of compositional ratios thereof leads to relatively large enhancement in adhesion property of the coating layer. However, the above technical measure is still not enough to obtain a sufficient adhesion property. In consequence, further enhancement in adhesion property of the coating layer has been studied by using combination of the above two kinds of compounds with other materials. As a result, by using the above compounds in combination with the polyester resin, acrylic resin or urethane resin, the obtained coating layer has been unexpectedly considerably improved in adhesion property, so that there has been successfully provided a coating layer which can be used for protecting a polarizing film.

The polyester resin used in the first coating layer of the present invention may be mainly constituted, for example, from the following polycarboxylic acid and polyhydroxy compound. Examples of the polycarboxylic acid include terephthalic acid, isophthalic acid, orthophthalic acid, phthalic acid, 4,4'-diphenyldicarboxylic acid, 2,5-naphthalenedicarboxylic acid, 1,5-naphthalenedicarboxylic acid, 2,6-naphthalenedicarboxylic acid, 2,7-naphthalenedicarboxylic acid, 1,4-cyclohexanedicarboxylic acid, adipic acid, azelaic acid, sebacic acid, dodecanedicarboxylic acid, glutaric acid, succinic acid, trimellitic acid, trimesic acid, pyromellitic acid, trimellitic anhydride, pyromellitic anhydride, phthalic anhydride, p-hydroxybenzoic acid, a trimellitic acid monopotassium salt, and ester-forming derivatives thereof. Examples of the polyhydroxy compound include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, a bisphenol A-ethylene glycol adduct, diethylene glycol, triethylene glycol, polyethylene glycol, polypropylene glycol, polytetramethylene glycol, polytetramethyleneoxide glycol, dimethylolpropionic acid, glycerol, trimethylol propane, potassium dimethylolpropionate or the like. The polyester resin may be synthesized by selecting at least one polycarboxylic acid and at least one polyhydric compound and subjecting these compounds to polycondensation reaction by an ordinary method.

In the case where the polyester resin is dispersed in water, a hydrophilic group is generally introduced into the polyester resin. Examples of the hydrophilic group include a carboxyl group, a sulfonic group or the like. Among the water dispersions, a water dispersion of the polyester resin into which a carboxyl group is introduced, is preferred from the standpoint of enhanced adhesion property of the obtained coating layer.

The acrylic resin incorporated in the first coating layer in the present invention is in the form of a polymer obtained from a polymerizable monomer having a carbon-to-carbon double bond such as, typically, an acrylic monomer and a methacrylic monomer. The polymer may be either a homopolymer or a copolymer. The polymer may also include a copolymer of the polymer with the other polymer (for example, a polyester, a polyurethane, etc). Examples of the copolymer include a block copolymer and a graft copolymer. In addition, the polymer may also include a polymer obtained by polymerizing the polymerizable monomer having a carbon-to-carbon double bond in a polyester solution or a polyester dispersion (which may also be in the form of a mixture of the polymers). Further, the polymer may also include a polymer obtained by polymerizing the polymerizable monomer having a carbon-to-carbon double bond in a polyurethane solution or a polyurethane dispersion (which may also be in the form of a mixture of the polymers). Similarly, the polymer may also include a polymer obtained by polymerizing the polymerizable monomer having a carbon-to-carbon double bond in the other polymer solution or the other polymer dispersion (which may also be in the form of a mixture of the polymers). Further, in order to further enhance an adhesion property, the acrylic resin used in the first coating layer may also comprise a hydroxyl group.

The above polymerizable monomer having a carbon-to-carbon double bond is not particularly limited. Examples of the typical compounds as the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl(meth)acrylate, 2-hydroxypropyl (meth) acrylate, 4-hydroxybutyl(meth)acrylate, monobutylhydroxyl fumarate and monobutylhydroxyl itaconate; various (meth) acrylic acid esters such as methyl (meth)acrylate, ethyl(meth) acrylate, propyl(meth)acrylate, butyl(meth)acrylate and lauryl(meth)acrylate; various nitrogen-containing compounds such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl propionate; various silicon-containing polymerizable monomers such as γ-methacryloxypropyl trimethoxysilane and vinyl trimethoxysilane; various phosphorus-containing vinyl-based monomers; various halogenated vinyl-based monomers such as vinyl chloride and vinylidene chloride; and various conjugated dienes such as butadiene.

The urethane resin included in the first coating layer in the present invention is a high-molecular compound having a urethane bond in a molecule thereof. The urethane resin may be usually produced by the reaction between a polyol and an isocyanate. Examples of the polyol include polycarbonate polyols, polyester polyols, polyether polyols, polyolefin polyols and acrylic polyols. These compounds may be used alone or in combination of any two or more thereof.

The polycarbonate-based polyols are obtained from a polyhydric alcohol and a carbonate compound by dealcoholization reaction therebetween. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexanedimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate-based polyols obtained by the reaction between these compounds include poly(1,6-hexylene)carbonate and poly(3-methyl-1,5-pentylene)carbonate.

Examples of the polyester polyols include those produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol).

Examples of the polyether polyols include polyethylene glycol, polypropylene glycol, polyethylene/propylene glycol, polytetramethylene ether glycol and polyhexamethylene ether glycol.

In order to enhance an adhesion property of the coating layer to various adhesive layers, among these polyols, the polycarbonate polyols may be more suitably used.

Examples of the polyisocyanate compound used for obtaining the urethane resin include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as α,α,α',α'-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof.

When the urethane resin is synthesized, there may be used a chain extender. The chain extender is not particularly limited as long as it has tow or more active groups capable of reacting with an isocyanate group. In general, there may be mainly used such a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidenecyclohexyl-4,4'-diamine, 1,4-diaminocyclohexane and 1,3-bisaminomethyl cyclohexane.

The urethane resin used in the present invention may be dispersed or dissolved in a solvent as a medium, and is preferably dispersed or dissolved in water as the medium. In order to disperse or dissolve the urethane resin in water, there may be used those urethane resins of a forcibly emulsifiable type which can be dispersed and dissolved using an emulsifier, or those urethane resins of a self-emulsifiable type or a water-soluble type which are obtained by introducing a hydrophilic group into urethane resins, etc. Among these urethane resins, in particular, self-emulsifiable type urethane resins which are ionomerized by introducing an ionic group into a skeleton of urethane resins are preferred because they are excellent in storage stability of the coating solution as well as water resistance, transparency and adhesion property of the resulting coating layer. Examples of the ionic group to be introduced into the urethane resins include various groups such as a carboxyl group, a sulfonic acid group, a phosphoric acid group, a phosphonic acid group and a quaternary ammonium salt group. Among these ionic groups, preferred is a carboxyl group. As the method of introducing a carboxyl group into the urethane resin, there may be used various methods which may be carried out in respective stages of the polymerization reaction. For example, there may be used the method in which a carboxyl group-containing resin is used as a comonomer component upon synthesis of a prepolymer, or the method in which a carboxyl group-containing component is used as any one component of the polyol, the polyisocyanate, the chain extender and the like. In particular, there is preferably used the method in which a carboxyl group-containing diol is used to introduce a desired amount of a carboxyl group into the urethane resins by suitably adjusting an amount of the diol charged. For example, the diol used in the polymerization for production of the urethane resin may be copolymerized with dimethylol propionic acid, dimethylol butanoic acid, bis-(2-hydroxyethyl)propionic acid, bis-(2-hydroxyethyl)butanoic acid, etc. In addition, the carboxyl group thus introduced is preferably formed into a salt thereof by neutralizing the carboxyl group with ammonia, amines, alkali metals, inorganic alkalis, etc. Among these compounds used for the neutralization, especially preferred are ammonia, trimethylamine and triethylamine. When using such a polyurethane resin, the carboxyl group thereof from which the neutralizing agent is removed in the drying step after the coating step may be used as a crosslinking reaction site which can be reacted with other crosslinking agents. As a result, the above-described urethane resin is excellent in stability when preserved in the form of a solution before being coated, and further the coating layer obtained therefrom can be further improved in durability, solvent resistance, water resistance, anti-blocking property, etc.

Among these polyester resins, acrylic resins and urethane resins, from the viewpoint of maintaining a good adhesion property even under more server conditions, the polyester resins can be more suitably used.

The polyvinyl alcohol used in the first coating layer in the present invention is a compound having a polyvinyl alcohol moiety, and there may be used conventionally known polyvinyl alcohols which may also include, for example, modified compounds prepared by partially modifying polyvinyl alcohol with acetal, butyral or the like. The polymerization degree of the polyvinyl alcohol is not particularly limited, and is usually not less than 100, and preferably in the range of 300 to 40000. When the polymerization degree of the polyvinyl alcohol is less than 100, the resulting coating layer tends to be deteriorated in water resistance. Also, the saponification degree of the polyvinyl alcohol is not particularly limited, and there may be practically used polyvinyl acetate saponified products having a saponification degree of not less than 70 mol % and preferably 70 to 99.9 mol %.

The oxazoline compound which may be compounded in the first coating layer in the present invention includes those compounds having an oxazoline group in a molecule thereof. Especially preferred are polymers having an oxazoline group which may be in the form of a homopolymer of an addition-polymerizable oxazoline group-containing monomer or a copolymer of the addition-polymerizable oxazoline group-containing monomer with the other monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These oxazoline compounds may be used alone or in the form of a mixture of any two or more thereof. Among these oxazoline compounds, 2-isopropenyl-2-oxazoline is more preferred because of industrial availability thereof. The other monomers used in the copolymer are not particularly limited as long as they are copolymerizable with the addition-polymerizable oxazoline group-containing monomer. Examples of the other monomers include (meth)acrylic acid esters such as alkyl(meth)acrylates (in which the alkyl group may be methyl, ethyl, n-propyl, isopropyl, n-butyl, isobutyl, t-butyl, 2-ethylhexyl or cyclohexyl); unsaturated carboxylic acids such as acrylic acid, methacrylic acid, itaconic acid, maleic acid, fumaric acid, crotonic acid, styrenesulfonic acid and salts of these acids (such as sodium salts, potassium salts, ammonium salts and tertiary amine salts); unsaturated nitriles such as acrylonitrile and methacrylonitrile; unsaturated amides such as (meth)acrylamide, N-alkyl(meth)acrylamide and N,N-dialkyl (meth)acrylamide (in which the alkyl group may be methyl, ethyl, n-propyl, isopropyl, n-butyl, isobutyl, t-butyl, 2-ethylhexyl or cyclohexyl); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These other monomers may be used alone or in combination of any two or more thereof.

In particular, among these oxazoline compounds, preferred are those polymers having an oxazoline group on a side chain thereof. Such polymers may be readily obtained by polymerizing the addition-polymerizable oxazoline group-containing monomer with the other monomer. Examples of the commercial product of the oxazoline compound produced using an acrylic monomer as the other monomer include "EPOCROSS WS-500" and "EPOCROSS WS-300" (both produced by Nippon Shokubai Co., Ltd.) which are in the form of a polymer-type crosslinking agent in which an oxazoline group is bonded as a branched chain to an acrylic resin.

In addition, the first coating layer preferably has a less content of a hydrophilic group such as polyalkylene glycol components and a large content of an oxazoline group because it is expected to enhance a coating film strength and a wet heat resistance of the coating layer.

The content of the polyester resin, acrylic resin or urethane resin in the first coating layer of the film according to the present invention is usually 10 to 80% by weight, preferably 15 to 65% by weight and more preferably 20 to 40% by weight. When the content of the polyester resin, acrylic resin or urethane resin in the first coating layer is out of the above-specified range, it may be difficult to attain a sufficient adhesion between the polyester film and the adhesive layer through the coating layer.

The content of the polyvinyl alcohol in the first coating layer of the film according to the present invention is usually 10 to 80% by weight, preferably 15 to 60% by weight and more preferably 20 to 50% by weight. When the content of the polyvinyl alcohol in the first coating layer is less than 10% by weight, the resulting coating layer tends to hardly exhibit a sufficient adhesion property to the adhesive layer owing to the less content of the polyvinyl alcohol component. When the content of the polyvinyl alcohol in the first coating layer is more than 80% by weight, the resulting coating layer tends to hardly exhibit a sufficient bonding property to the polyester film owing to a less content of the other components.

The content of the oxazoline compound in the first coating layer of the film according to the present invention is usually 10 to 80% by weight, preferably 15 to 60% by weight and more preferably 20 to 40% by weight. When the content of the oxazoline compound in the first coating layer is less than 10% by weight, the resulting coating layer tends to become brittle and tends to be deteriorated in wet heat resistance owing to a less content of crosslinking components. When the content of the oxazoline compound in the first coating layer is more than 80% by weight, the resulting coating layer tends to hardly exhibit a sufficient bonding property to the polyester film or tends to hardly exhibit a sufficient adhesion property to the adhesive layer owing to a less content of the other components.

The weight ratio of the "polyester resin, acrylic resin or urethane resin/polyvinyl alcohol/oxazoline compound" compounded in the first coating layer of the film according to the present invention is usually in the range of 1.0 to 8.0/1.0 to 8.0/1.0 to 8.0, preferably 1.0 to 4.3/1.0 to 4.0/1.0 to 4.0 and more preferably 1.0 to 2.0/1.0 to 2.5/1.0 to 2.0.

In the first coating layer of the film according to the present invention, in order to improve surface properties of the coating layer and improve a transparency of the resulting film, a binder polymer other than the above polyester resin, acrylic resin or urethane resin and the polyvinyl alcohol may be used in combination therewith.

The "binder polymer" used in the present invention is defined as a high-molecular compound having a number-average molecular weight (Mn) of not less than 1000 as measured by gel permeation chromatography (GPC) and exhibiting a good film-forming property, according to a flow scheme for evaluation of safety of high-molecular compounds (Council of Chemical Substances; November, 1985).

Specific examples of the binder polymer include polyalkylene glycols, polyalkylene imines, methyl cellulose, hydroxy cellulose, starches, etc.

Further, in the first coating layer, the above components may be used in combination with a crosslinking agent other than the oxazoline compound unless the subject matter of the present invention is adversely affected. As the crosslinking agent, there may be used various conventionally known resins. Examples of the crosslinking agent include melamine compounds, epoxy compounds, isocyanate compounds and carbodiimide compounds. These crosslinking agents may be used in an amount of usually 3 to 50% by weight and preferably 5 to 40% by weight based on a total weight of at least one resin selected from the group consisting of the polyester resin, acrylic resin and urethane resin, the polyvinyl alcohol and the oxazoline compound.

The melamine compounds are compounds having a melamine skeleton therein. Examples of the melamine compounds include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In addition, there may also be used those compounds obtained by co-condensing a urea or the like with a part of melamine. Further, a catalyst may also be used to enhance a reactivity of the melamine compound. In particular, among these melamine compounds, preferred are alkylated melamine compounds, and more preferred are completely alkylated melamine compounds. Examples of the completely alkylated melamine compounds include hexamethoxymethyl melamine and the like.

Examples of the epoxy compound include compounds having an epoxy group in a molecule thereof, and prepolymers and cured products of the compounds. Examples of the epoxy compound include condensates of epichlorohydrin with a hydroxyl group of ethylene glycol, polyethylene glycol, glycerol, polyglycerol, bisphenol A, etc., or with an amino group. Specific examples of the epoxy compound include polyepoxy compounds, diepoxy compounds, monoepoxy compounds and glycidyl amine compounds. Examples of the polyepoxy compounds include sorbitol, polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

In particular, among these epoxy compounds, preferred are polyfunctional epoxy compounds, and more preferred are polyfunctional epoxy compounds having at least two glycidyl ether structures. Examples of the commercially available products of the epoxy compounds include "DECONAL EX-521" (as polyglycerol polyglycidyl ether) produced by Nagase Chemtex Co., Ltd., etc.

Examples of the isocyanate compound include those compounds having an isocyanate group in a molecule thereof. Specific examples of the isocyanate compound include hexamethylene diisocyanate, trimethyl hexamethylene diisocyanate, cyclohexylene diisocyanate, xylylene diisocyanate, isophorone diisocyanate, naphthalene diisocyanate, tolylene diisocyanate, and blocked products or derivatives of these compounds.

Among these crosslinking agents, in particular, when using the epoxy compound in combination, the resulting coating layer can be strengthened, so that it is expected to enhance an adhesion property and a wet heat resistance thereof. Further, in view of the application to in-line coating, these crosslinking agents preferably exhibit a water solubility or a water dispersibility.

In addition, for the purposes of improving an anti-blocking property and a slip property of the coating layer, the first coating layer may also comprise particles. Examples of the particles used in the first coating layer include inorganic particles such as particles of silica, alumina and metal oxides, and organic particles such as crosslinked polymer particles.

The second coating layer used in the present invention is designed to impart a low reflectance to the resulting film. When used as a protective film for protecting a rear surface of the rear side polarizing plate, the second coating layer is a coating layer capable of enhancing a total light transmittance of the obtained polarizing plate. The total light transmittance of the laminated polyester film may be determined in view of optical properties of the polyester film, the first coating layer and the second coating layer. When using the coating layer as a protective film to be attached to a polarizing film, the optical properties on the side attached to the polarizing film do not largely contribute to the total light transmittance of the polarizing plate as a whole. Therefore, the most important optical properties are those on the side not attached to the polarizing film, i.e., on the side of the second coating layer. The total light transmittance of the laminated polyester film may also be influenced by the first coating layer to some extent, and therefore may not be strictly discussed, but is generally not less than 90.0%, preferably not less than 90.5% and more preferably not less than 91.0%.

As a result of various studies made for more accurately understanding optical properties of the second coating layer only and examining a total light transmittance of the resulting polarizing plate, it has been found that the consideration about an absolute reflectance of the second coating layer only is important. The reflectance and transmittance are properties having an interrelation to each other. It has been noticed that in the polyester film having a less light absorption and a high transparency, in general, a high transmittance of the film indicates a low reflectance thereof.

In the present invention, in order to enhance a total light transmittance of the resulting polarizing plate, it is essentially required that the second coating layer has an absolute reflectance exhibiting one minimum value in a wavelength range of 300 to 800 nm wherein the minimum value is not more than 3.5%. The wavelength range in which the minimum value of the absolute reflectance is to be present is preferably in the range of 400 to 700 nm, and more preferably 450 to 650 nm. The minimum value is preferably not more than 3.0% and more preferably not more than 2.5%.

When the absolute reflectance of the second coating layer of the laminated polyester film fails to satisfy the above requirements, the resulting polarizing plate tends to exhibit a low total light transmittance and thereby tends to be deteriorated in brightness, so that a liquid crystal display obtained using such a polarizing plate tends to exhibit a dark image screen.

The acrylic resin or urethane resin generally has a low refractive index, and therefore is a material suitable for achieving the above absolute reflectance, namely, enhancing a total light transmittance of the resulting polarizing plate, and can provide an effective material for forming the second coating layer used in the present invention. In addition, when controlling the thickness of the second coating layer to the range of 0.04 to 0.15 µm, it is possible to effectively enhance a total light transmittance of the resulting polarizing plate.

As the acrylic resin to be incorporated in the second coating layer, there may be used the same various acrylic resins as explained for the first coating layer. Further, in order to more efficiently enhance the total light transmittance, there may also be used fluorine-containing compounds having a low refractive index.

As the urethane resin to be incorporated in the second coating layer, there may be used the same various urethane resins as explained for the first coating layer. Further, in order to more efficiently enhance the total light transmittance, there may also be used fluorine-containing compounds having a low refractive index.

In the film of the present invention, the content of the acrylic resin or urethane resin in the second coating layer may vary depending upon a refractive index of the acrylic resin or urethane resin, and therefore is not particularly limited, and is preferably in the range of not less than 40% by weight, more preferably not less than 50% by weight and still more preferably not less than 60% by weight. When the content of the acrylic resin or urethane resin in the second coating layer is less than 40% by weight, it may be difficult to sufficiently enhance a total light transmittance of the resulting film.

In the second coating layer used in the present invention, in order to improve surface properties of the coating layer and improve a transparency of the resulting film, a binder polymer other than the above acrylic resin or urethane resin may be used in combination therewith. As the binder used in combination with the acrylic resin or urethane resin, it is preferred not to use those having a high refractive index in view of adverse influence on the total light transmittance.

Specific examples of the binder polymer include polyester resins, polyalkylene glycols, polyalkylene imines, methyl cellulose, hydroxy cellulose, starches, etc.

In addition, unless the subject matter of the present invention is adversely affected, the second coating layer may also comprise a crosslinking agent. When using the crosslinking agent in combination, the obtained coating layer can be increased in strength and therefore can be enhanced in wet heat resistance and mar resistance. Examples of the crosslinking agent include melamine compounds, epoxy compounds, oxazoline compounds, isocyanate compounds and carbodiimide-based compounds. These crosslinking agents may be used alone or in the form of a mixture of any two or more thereof. Further, in view of the application to in-line coating, the crosslinking agent preferably exhibits a water solubility or a water dispersibility.

Also, the second coating layer may also comprise particles in order to improve an anti-blocking property and a slipping property of the coating layer. Examples of the particles which may be contained in the second coating layer include inorganic particles such as particles of silica, alumina, metal oxides and the like, and organic particles such as crosslinked polymer particles.

Further, the first and second coating layers may also respectively comprise various additives such as a defoaming agent, a coatability improver, a thickening agent, an organic lubricant, an antistatic agent, an ultraviolet absorber, an antioxidant, a foaming agent and a dye, if required, unless the subject matter of the present invention is adversely affected.

The analysis of the respective components compounded in the coating layers may be conducted, for example, by surface analysis such as TOF-SIMS.

When forming the respective coating layers by in-line coating, the laminated polyester film is preferably produced by the method in which an aqueous solution or a water dispersion of a series of the above-mentioned compounds is prepared as a coating solution having a concentration of about 0.1 to about 50% by weight in terms of a solid content thereof, and the thus prepared coating solution is applied onto the polyester film.

The coating solution may also comprise a small amount of an organic solvent for the purpose of improving a dispersibility in water, a film-forming property, etc., unless the subject matter of the present invention is adversely affected. The organic solvent may be used alone, or two or more organic solvents may be appropriately used in the form of a mixture thereof.

The thickness of the first coating layer of the laminated polyester film according to the present invention is usually in the range of 0.002 to 1.0 μm, preferably 0.03 to 0.5 μm and more preferably 0.04 to 0.2 μm. When the thickness of the first coating layer is less than 0.002 μm, the resulting coating layer may fail to exhibit a sufficient adhesion property. When the thickness of the first coating layer is more than 1.0 μm, the resulting coating layer tends to be deteriorated in appearance and transparency, so that the obtained film tends to be deteriorated in anti-blocking property.

The thickness of the second coating layer of the laminated polyester film according to the present invention is usually in the range of 0.04 to 0.15 μm and preferably 0.06 to 0.13 μm. When the thickness of the second coating layer is out of the above-specified range, the resulting polarizing plate may fail to exhibit a high total light transmittance, although not surely mentioned since the total light transmittance may also vary depending upon a refractive index of the coating layer.

In the present invention, as the method of forming the respective coating layers, there may be used conventionally known coating methods such as a reverse gravure coating method, a direct gravure coating method, a roll coating method, a die coating method, a bar coating method and a curtain coating method which are described, for example, in Yuji HARAZAKI, "Coating Methods", Maki-shoten, 1979.

In the present invention, the drying and curing conditions used upon forming the coating layers on the polyester film are not particularly limited. For example, in the case where the coating layers are formed in an off-line coating manner, the coating layers may be subjected to heat treatment usually at a temperature of 80 to 200° C. for 3 to 40 sec and preferably at a temperature of 100 to 180° C. for 3 to 40 sec.

On the other hand, in the case where the coating layers are formed in an in-line coating manner, the coating layers may be subjected to heat treatment usually at a temperature of 70 to 280° C. for 3 to 200 sec.

In any of the off-line coating and in-line coating methods, the heat treatment may be used in combination with irradiation with active energy rays such as irradiation with ultraviolet rays, if required. The polyester film constituting the laminated polyester film of the present invention may be previously subjected to surface treatments such as corona treatment and plasma treatment.

When using the laminated polyester film of the present invention, for example, as a protective film for a polarizing film in a polarizing plate, the polarizing film is generally attached to the side of the first coating layer thereof through an adhesive for adhering the polarizing film thereto. As the adhesive, there may be used the conventionally known adhesives. Examples of the adhesive include polyvinyl alcohol, polyvinyl butyral, acrylic compounds such as poly(butyl acrylate), and epoxy compounds having an alicyclic epoxy group such as, for example, a glycidyl group and an epoxycyclohexane group.

Onto the adhesive layer thus formed is attached a polarizing film, for example, a monoaxially stretched polyvinyl alcohol film dyed with iodine, etc. A protective film or a retardation film may be further attached onto the opposite side of the polarizing film to produce a polarizing plate. That is, when using the laminated polyester film of the present invention in a polarizing plate, the obtained polarizing plate may have a layer configuration of the "protective film/polarizing film/adhesive/first coating later/polyester film/second coating layer".

EXAMPLES

The present invention is described in more detail below by Examples. However, these Examples are only illustrative and not intended to limit the present invention thereto. In addition, the measuring and evaluating methods used in the present invention are as follows.

(1) Method for Measuring Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Method for Measuring Average Particle Diameter ($d_{50}$: μm):

Using a centrifugal precipitation type particle size distribution measuring apparatus "SA-CP3 Model" manufactured by Shimadzu Seisakusho Co., Ltd., the value of a particle size corresponding to a cumulative fraction of 50% (based on the weight) in equivalent spherical distribution of the particles was measured as an average particle diameter of the particles.

(3) Method of Measuring Thickness of Coating Layer:

The surface of the coating layer was dyed with $RuO_4$ and embedded in an epoxy resin. Thereafter, the resin-embedded coating layer was cut into a piece by an ultrathin sectioning method, and dyed with $RuO_4$ to observe and measure a cut section of the coating layer using TEM ("H-7650" manufactured by Hitachi Ltd.; accelerated voltage: 100 V).

(4) Method of Evaluating Adhesion Property:

A 5 wt % polyvinyl alcohol aqueous solution having a polymerization degree of 1000 and a saponification degree of 98.5 mol % as an adhesive was applied on the surface of the first coating layer of the laminated polyester film and then dried such that a thickness of the obtained coating film after dried was 2 μm to form an adhesive layer thereon. The thus formed adhesive layer was attached with a 18 mm-wide tape ("Cellotape (registered trademark) Lpack (registered trademark) LP-18" produced by Nichiban Co., Ltd.) (adhesion property 1), or the adhesive layer was first subjected to cross-cutting to form 100 (10×10) cross-cuts thereon and then attached with a 24 mm-wide tape ("Cellotape (registered trademark) Lpack (registered trademark) LP-24" produced by Nichiban Co., Ltd.) (adhesion property 2). The thus attached tape was rapidly peeled off from the adhesive layer at a peel angle of 180°. Then, the surface of the adhesive layer from which the tape was peeled off was observed to measure an area of the adhesive layer peeled off together with the tape. The evaluation ratings are as follows.

A: Peeled area of the adhesive layer was not more than 5%.

B: Peeled area of the adhesive layer was more than 5% and not more than 20%.

C: Peeled area of the adhesive layer was more than 20% and not more than 50%.

D: Peeled area of the adhesive layer was more than 50%.

Meanwhile, with respect to the above evaluation of adhesion property, the "adhesion property 2" corresponds to a more severe evaluation test than the "adhesion property 1".

(5) Method of Measuring Minimum Value of Absolute Reflectance from Surface of Second Coating Layer Formed on Polyester Film:

A black tape ("Vinyl Tape VT-50" produced by Nichiban Co., Ltd.) was previously attached to a back surface (first coating layer-side surface) of a polyester film which was opposite to its surface to be measured, and the surface of the coating layer formed on the polyester film was subjected to measurement for an absolute reflectance thereof in a wavelength range of 300 to 800 nm using a spectrophotometer (an ultraviolet/visible spectrophotometer "V-570" and an automatic absolute reflectance analyzer "AM-500N" both manufactured by JASCO Corp.) under the conditions including a synchronous mode; an incident angle of 5°; N-polarization; response: Fast; data sampling interval: 1.0 nm; band width: 10 nm; scanning speed: 1000 m/min, to thereby evaluate a wavelength at a minimum value of the reflectance (bottom wavelength) as well as the absolute reflectance.

(6) Method of Measuring Total Light Transmittance:

Measured using a haze meter "HM-150" manufactured by Murakami Color Research Laboratory Co., Ltd., according to JIS K 7361.

(7) Method of Measuring Total Light Transmittance of Polarizing Plate Produced:

A 5 wt % polyvinyl alcohol aqueous solution having a polymerization degree of 1000 and a saponification degree of 98.5 mol % was applied on the surface of the first coating layer of the laminated polyester film to form a coating layer, and then a polarizing film formed of a polyvinyl alcohol and iodine was attached on the resulting coating layer using a roller machine and dried at 70° C. for 4 min, thereby producing a polarizing plate. On the other hand, a reference polarizing plate was produced from a triacetyl cellulose film (TAC film) in the same manner as described above. The polarizing plates were measured for their total light transmittance using a haze meter "HM-150" manufactured by Murakami Color Research Laboratory Co., Ltd., according to JIS K 7361 to thereby evaluate a total light transmittance of the polarizing plate produced from the laminated polyester film. More specifically, the total light transmittance of the polarizing plate was compared with that of the reference polarizing plate produced from the TAC film, and the evaluation results were classified into the following ratings.

Good: prop rate of total light transmittance is not more than 1%.

Poor: prop rate of total light transmittance is more than 1%, so that there is a risk of causing deterioration in brightness.

(8) Measurement of Transmittance at Wavelength of 380 nm:

Using a spectrophotometer ("UV-3100PC Model" manufactured by Shimadzu Seisakusho Corp.), the light transmittance of the film was continuously measured at a low scanning speed and a sampling pitch of 2 nm in a wavelength range of 300 to 700 nm to detect a light transmittance of the film at a wavelength of 380 nm.

The polyesters used in the respective Examples and Comparative Examples were prepared by the following methods.

<Method for Producing Polyester (A)>

One hundred parts by weight of dimethyl terephthalate and 60 parts by weight of ethylene glycol as starting materials were charged together with 0.09 part by weight of magnesium acetate tetrahydrate as a catalyst into a reaction vessel, and the reaction therebetween was initiated at 150° C. The reaction temperature was gradually raised while distilling off methanol as produced, and allowed to reach 230° C. after 3 hr. After 4 hr, the transesterification reaction was substantially terminated. Into the obtained reaction mixture were added 0.04 part by weight of ethyl acid phosphate and then 0.04 part by weight of antimony trioxide, followed by subjecting the resulting mixture to polycondensation reaction for 4 hr. More specifically, the reaction temperature was gradually raised from 230° C. until reaching 280° C. On the other hand, the reaction pressure was gradually reduced from normal pressure until finally reaching 0.3 mmHg. After initiation of the reaction, the change in agitation power in the reaction vessel was monitored, and the reaction was terminated at the time at which a viscosity of the reaction solution reached the value corresponding to an intrinsic viscosity of 0.63 on the basis of the change in agitation power in the reaction vessel. The resulting polymer was discharged from the reaction vessel under application of a nitrogen pressure thereto, thereby obtaining a polyester (A) having an intrinsic viscosity of 0.63.

<Method for Producing Polyester (B)>

The same procedure as defined in the above method for producing the polyester (A) was conducted except that after adding 0.04 part by weight of ethyl acid phosphate, 0.2 part by weight of silica particles having an average particle diameter of 2.0 μm in the form of a dispersion in ethylene glycol and 0.04 part by weight of antimony trioxide were added, and the reaction was terminated at the time at which a viscosity of the reaction solution reached the value corresponding to an intrinsic viscosity of 0.65, thereby obtaining a polyester (B) having an intrinsic viscosity of 0.65.

<Method for Producing Polyester (C)>

The polyester (A) was charged into a vented twin-screw extruder, and 2,2-(1,4-phenylene)bis[4H-3,1-benzoxazin-4-one] ("CYASORB UV-3638" produced by CYTEC Corp.; molecular weight: 369; benzoxazinone-based compound) as an ultraviolet absorber was further added thereto such that a concentration of the ultraviolet absorber in the resulting mixture was 10% by weight. The thus obtained mixture was melt-kneaded and extruded to form chips, thereby obtaining an ultraviolet absorber-containing master batch polyester (C). The resulting polyester (C) had an intrinsic viscosity of 0.59.

The examples of the compounds constituting the coating layers are as follows.

(Examples of Compounds)

Polyester Resin: (IA)

Carboxylic acid-based water dispersion of a polyester resin obtained by copolymerizing the following composition:

Monomer composition: (acid component) isophthalic acid/trimellitic acid//(diol component) diethylene glycol/neopentyl glycol=96/4//80/20 (mol %)

Polyester Resin: (IB)

Carboxylic acid-based water dispersion of a polyester resin obtained by copolymerizing the following composition:

Monomer composition: (acid component) terephthalic acid/isophthalic acid//(diol component) ethylene glycol/diethylene glycol/neopentyl glycol/dimethylol propionic acid=20/80//16/64/12/8 (mol %)

Polyester Resin: (IC)

Sulfonic acid-based water dispersion of a polyester resin obtained by copolymerizing the following composition:

Monomer composition: (acid component) terephthalic acid/isophthalic acid/5-sodium sulfoisophthalate//(diol component) ethylene glyco/1,4-butanediol/diethylene glycol=56/40/4//70/20/10 (mol %)

Acrylic Resin: IIA Water Dispersion of Acrylic Resin Obtained by Polymerizing the Following Composition:

Emulsion polymer (emulsifier: anionic surfactant) produced from ethyl acrylate/n-butyl acrylate/methyl methacrylate/N-methylol acrylamide/acrylic acid=65/21/10/2/2 (% by weight)

Acrylic Resin: (IB) Water Dispersion of Acrylic Resin Obtained by Polymerizing the Following Composition:

Emulsion polymer (emulsifier: anionic surfactant) produced from ethyl acrylate/methyl methacrylate/2-hydroxyethyl methacrylate/N-methylol acrylamide/acrylic acid=65/28/3/2/2 (% by weight)

Urethane: (IIIA)

Water dispersion of a urethane resin which was obtained by neutralizing a urethane prepolymer resin produced from 80 parts of a polycarbonate polyol having a number-average molecular weight of 2000 which was obtained from 1,6-hexanediol and diethyl carbonate, 4 parts of polyethylene glycol having a number-average molecular weight of 400, 12 parts of methylene-bis(4-cyclohexyl isocyanate) and 4 parts of dimethylol butanoic acid, with triethylamine.

Urethane: (IIIB)

Water dispersion of a urethane resin which was obtained by neutralizing a prepolymer produced from 400 parts of a polycarbonate polyol having a number-average molecular weight of 2000 which was obtained from 1,6-hexanediol and diethyl carbonate, 10.4 parts of neopentyl glycol, 58.4 parts of isophorone diisocyanate and 74.3 parts of dimethylol butanoic acid, with triethylamine, and then subjecting the neutralized product to chain extension reaction using isophorone diamine.

Urethane Resin: (IIIC)

Carboxylic acid water-dispersed type polyester polyurethane resin "HYDRAN AP-40" (produced by DIC Corp.)

Polyvinyl Alcohol: (IV)

Polyvinyl alcohol having a saponification degree of 88 mol % and a polymerization degree of 500

Oxazoline Compound: (VA)

Oxazoline group- and polyalkyleneoxide chain-containing acrylic polymer "EPOCROSS WS-500" (produced by Nippon Shokubai Co., Ltd.); oxazoline group content: about 4.5 mmol/g Oxazoline Compound: (VB)

Oxazoline group-containing acrylic polymer "EPOCROSS WS-300" (produced by Nippon Shokubai Co., Ltd.); oxazoline group content: about 7.7 mmol/g Epoxy Compound: (VIA)

Polyglycerol polyglycidyl ether "DECONAL EX-521" (produced by Nagase Chemtex Co., Ltd.

Melamine Compound: (VIB)

hexamethoxymethyl melamine

Particles: (VII)

Silica sol having an average particle diameter of 65 nm

EXAMPLE 1

A mixed raw material obtained by mixing the polyesters (A) and (B) in amounts of 90% and 10%, respectively, as a raw material for outermost layers (surface layers), and a mixed raw material obtained by mixing the polyesters (A) and (C) in amounts of 85% and 15%, respectively, as a raw material for an intermediate layer, were respectively charged into two extruders, melted therein at 285° C., and then co-extruded therefrom on a cooling roll whose surface was controlled to a temperature of 40° C. to form a sheet having a two-kind/three-layer structure (surface layer/intermediate layer/surface layer), followed by cooling and solidifying the thus co-extruded sheet on the cooling roll, thereby obtaining an unstretched sheet. Next, the thus obtained unstretched sheet was stretched utilizing a difference between peripheral speeds of rolls at a temperature of 85° C. and a stretch ratio of 3.4 times in a longitudinal direction thereof. Thereafter, a coating solution A1 shown in the below-mentioned Table 1 was applied on one surface of the thus obtained longitudinally stretched sheet (formation of a first coating layer), and a coating solution B1 shown in the below-mentioned Table 2 was applied on the opposite surface of the sheet (formation of a second coating layer). Then, the resulting coated sheet was introduced into a tenter where the sheet was stretched at a temperature of 120° C. and a stretch ratio of 4.3 times in a lateral direction thereof and then heat-treated at 225° C. Next, the obtained stretched sheet was relaxed by 2% in a lateral direction thereof, thereby obtaining a polyester film having a thickness of 38 μm (each surface layer: 4 μm; intermediate layer: 30 μm) which was provided on both the surfaces thereof with the first and second coating layers having a thickness (after dried) of 0.05 μm and 0.10 μm, respectively. As a result of evaluating properties of the thus obtained polyester film, it was confirmed that the first coating layer exhibited a good adhesion property, and the minimum value of an absolute reflectance of the second coating layer was suppressed to a low level, i.e., 2.5%. It was also confirmed that the resulting polyester film had a total light transmittance of 4% as measured at 380 nm and therefore was capable of well absorbing ultraviolet radiation. The properties of the obtained polyester film are shown in Table 3 below.

EXAMPLES 2 TO 19

The same procedure as defined in Example 1 was conducted except that the coating agent composition was changed to those shown in Tables 1 and 2, thereby obtaining polyester films. The properties of the thus obtained polyester films are shown in Table 3.

EXAMPLE 20

The same procedure as defined in Example 1 was conducted except that a mixed raw material obtained by mixing the polyesters (A) and (B) in amounts of 90% and 10%, respectively, was used as a raw material for outermost layers (surface layers), and a mixed raw material obtained by mixing the polyesters (A) and (C) in amounts of 80% and 20%, respectively, was used as a raw material for an intermediate layer, thereby obtaining a polyester film. The properties of the thus obtained polyester film are shown in Table 3 below. It was also confirmed that the obtained polyester film had a transmittance of 1% as measured at 380 nm and therefore was capable of well absorbing ultraviolet radiation.

EXAMPLE 21

The same procedure as defined in Example 1 was conducted except that a mixed raw material obtained by mixing the polyesters (A) and (B) in amounts of 90% and 10%, respectively, was used as a raw material for outermost layers (surface layers), and a mixed raw material obtained by mixing the polyesters (A) and (C) in amounts of 90% and 10%, respectively, was used as a raw material for an intermediate layer, thereby obtaining a polyester film. The properties of the thus obtained polyester film are shown in Table 3 below. It was also confirmed that the obtained polyester film had a transmittance of 9% as measured at 380 nm and therefore was capable of well absorbing ultraviolet radiation.

EXAMPLE 22

The same procedure as defined in Example 1 was conducted except that a mixed raw material obtained by mixing the polyesters (A) and (B) in amounts of 90% and 10%, respectively, was used as a raw material for outermost layers (surface layers), and the polyester (A) solely was used as a raw material for an intermediate layer, thereby obtaining a polyester film. The properties of the thus obtained polyester film are shown in Table 3 below.

COMPARATIVE EXAMPLES 1 TO 10

The same procedure as defined in Example 1 was conducted except that the coating agent composition was changed to those shown in Tables 1 and 2, thereby obtaining polyester films. As a result of evaluating properties of the thus obtained laminated polyester films, it was confirmed that as shown in Table 4 below, some of the polyester films had a poor adhesion property, and some of the polyester films failed to exhibit a minimum value of the reflectance or exhibited a high minimum value of the reflectance.

TABLE 1

| Coating | Coating agent composition (wt %) | | | | | | |
|---|---|---|---|---|---|---|---|
| solutions | IA | IB | IV | VA | VB | VIA | VII |
| Solution A1 | 30 | 0 | 30 | 35 | 0 | 0 | 5 |
| Solution A2 | 30 | 0 | 30 | 0 | 35 | 0 | 5 |
| Solution A3 | 0 | 30 | 30 | 25 | 0 | 10 | 5 |
| Solution A4 | 0 | 30 | 30 | 0 | 25 | 10 | 5 |
| Solution A5 | 20 | 0 | 45 | 30 | 0 | 0 | 5 |
| Solution A6 | 15 | 0 | 35 | 45 | 0 | 0 | 5 |
| Solution A7 | 65 | 0 | 15 | 15 | 0 | 0 | 5 |
| Solution A8 | 45 | 0 | 15 | 15 | 0 | 20 | 5 |
| Solution A9 | 50 | 0 | 30 | 15 | 0 | 0 | 5 |
| Solution C1 | 95 | 0 | 0 | 0 | 0 | 0 | 5 |
| Solution C2 | 0 | 0 | 95 | 0 | 0 | 0 | 5 |
| Solution C3 | 0 | 0 | 0 | 95 | 0 | 0 | 5 |
| Solution C4 | 65 | 0 | 30 | 0 | 0 | 0 | 5 |
| Solution C5 | 0 | 0 | 65 | 30 | 0 | 0 | 5 |
| Solution C6 | 0 | 0 | 30 | 65 | 0 | 0 | 5 |
| Solution C7 | 65 | 0 | 0 | 30 | 0 | 0 | 5 |

TABLE 2

| Coating | Coating agent composition (wt %) | | | | |
|---|---|---|---|---|---|
| solutions | IC | IIA | IIIC | VIB | VII |
| Solution B1 | 25 | 65 | 0 | 5 | 5 |
| Solution B2 | 0 | 95 | 0 | 0 | 5 |
| Solution B3 | 45 | 50 | 0 | 0 | 5 |
| Solution B4 | 10 | 0 | 85 | 0 | 5 |
| Solution C8 | 85 | 0 | 0 | 10 | 5 |

TABLE 3

| | First coating layer | | |
|---|---|---|---|
| Examples | Coating solution | Thickness (μm) | Adhesion property 2 |
| Example 1 | A1 | 0.05 | A |
| Example 2 | A2 | 0.03 | B |
| Example 3 | A2 | 0.05 | A |
| Example 4 | A2 | 0.08 | A |
| Example 5 | A3 | 0.05 | A |
| Example 6 | A4 | 0.05 | A |
| Example 7 | A5 | 0.05 | A |
| Example 8 | A6 | 0.05 | B |
| Example 9 | A7 | 0.05 | B |
| Example 10 | A8 | 0.05 | B |
| Example 11 | A9 | 0.05 | B |
| Example 12 | A1 | 0.05 | A |
| Example 13 | A1 | 0.05 | A |
| Example 14 | A1 | 0.05 | A |
| Example 15 | A1 | 0.05 | A |
| Example 16 | A1 | 0.05 | A |
| Example 17 | A1 | 0.05 | A |
| Example 18 | A1 | 0.05 | A |
| Example 19 | A1 | 0.03 | B |
| Example 20 | A1 | 0.05 | A |
| Example 21 | A1 | 0.05 | A |
| Example 22 | A1 | 0.05 | A |

| | Second coating layer | | | |
|---|---|---|---|---|
| Examples | Coating solution | Thickness (μm) | Bottom wavelength (nm) | Minimum value of absolute reflectance (%) |
| Example 1 | B1 | 0.10 | 560 | 2.5 |
| Example 2 | B1 | 0.10 | 560 | 2.5 |
| Example 3 | B1 | 0.10 | 560 | 2.5 |
| Example 4 | B1 | 0.10 | 560 | 2.5 |
| Example 5 | B1 | 0.10 | 560 | 2.5 |
| Example 6 | B1 | 0.10 | 560 | 2.5 |
| Example 7 | B1 | 0.10 | 560 | 2.5 |
| Example 8 | B1 | 0.10 | 560 | 2.5 |
| Example 9 | B1 | 0.10 | 560 | 2.5 |
| Example 10 | B1 | 0.10 | 560 | 2.5 |
| Example 11 | B1 | 0.10 | 560 | 2.5 |
| Example 12 | B2 | 0.10 | 530 | 2.1 |
| Example 13 | B3 | 0.10 | 540 | 2.9 |
| Example 14 | B4 | 0.10 | 540 | 2.9 |
| Example 15 | B1 | 0.06 | 340 | 3.1 |
| Example 16 | B1 | 0.08 | 440 | 2.6 |
| Example 17 | B1 | 0.12 | 640 | 2.5 |
| Example 18 | B1 | 0.14 | 770 | 2.5 |
| Example 19 | B1 | 0.06 | 340 | 3.1 |
| Example 20 | B1 | 0.10 | 560 | 2.5 |
| Example 21 | B1 | 0.10 | 560 | 2.5 |
| Example 22 | B1 | 0.10 | 560 | 2.5 |

| Examples | Total light transmittance (%) | Total light transmittance of polarizing plate | Transmittance at 380 nm (%) |
|---|---|---|---|
| Example 1 | 92.1 | Good | 4 |
| Example 2 | 91.5 | Good | 4 |
| Example 3 | 92.1 | Good | 4 |
| Example 4 | 93.1 | Good | 4 |
| Example 5 | 92.0 | Good | 4 |
| Example 6 | 92.0 | Good | 4 |
| Example 7 | 92.2 | Good | 4 |
| Example 8 | 92.4 | Good | 4 |
| Example 9 | 91.9 | Good | 4 |
| Example 10 | 91.7 | Good | 4 |
| Example 11 | 91.9 | Good | 4 |
| Example 12 | 92.6 | Good | 4 |
| Example 13 | 91.6 | Good | 4 |
| Example 14 | 91.6 | Good | 4 |
| Example 15 | 91.1 | Good | 4 |
| Example 16 | 91.9 | Good | 4 |
| Example 17 | 91.8 | Good | 4 |
| Example 18 | 91.1 | Good | 4 |
| Example 19 | 90.5 | Good | 4 |
| Example 20 | 92.1 | Good | 1 |
| Example 21 | 92.1 | Good | 9 |
| Example 22 | 92.1 | Good | 88 |

TABLE 4

| | First coating layer | | |
|---|---|---|---|
| Comparative Examples | Coating solution | Thickness (μm) | Adhesion property 2 |
| Comparative Example 1 | C1 | 0.05 | D |

TABLE 4-continued

| Comparative Examples | Coating solution | Thickness (μm) | Adhesion property 1 |
|---|---|---|---|
| Comparative Example 2 | C2 | 0.05 | D |
| Comparative Example 3 | C3 | 0.05 | D |
| Comparative Example 4 | C4 | 0.05 | D |
| Comparative Example 5 | C5 | 0.05 | D |
| Comparative Example 6 | C6 | 0.05 | C |
| Comparative Example 7 | C7 | 0.05 | D |
| Comparative Example 8 | A1 | 0.05 | A |
| Comparative Example 9 | A1 | 0.05 | A |
| Comparative Example 10 | A1 | 0.05 | A |

| | Second coating layer | | |
|---|---|---|---|
| Comparative Examples | Coating solution | Thickness (μm) | Bottom wavelength (nm) | Minimum value of absolute reflectance (%) |
| Comparative Example 1 | B1 | 0.10 | 560 | 2.5 |
| Comparative Example 2 | B1 | 0.10 | 560 | 2.5 |
| Comparative Example 3 | B1 | 0.10 | 560 | 2.5 |
| Comparative Example 4 | B1 | 0.10 | 560 | 2.5 |
| Comparative Example 5 | B1 | 0.10 | 560 | 2.5 |
| Comparative Example 6 | B1 | 0.10 | 560 | 2.5 |
| Comparative Example 7 | B1 | 0.10 | 560 | 2.5 |
| Comparative Example 8 | B1 | 0.03 | None | None |
| Comparative Example 9 | B1 | 0.17 | None | None |
| Comparative Example 10 | C8 | 0.10 | 520 | 3.7 |

| Comparative Examples | Total light transmittance (%) | Total light transmittance of polarizing plate | Transmittance at 380 nm (%) |
|---|---|---|---|
| Comparative Example 1 | 91.3 | Good | 4 |
| Comparative Example 2 | 92.4 | Good | 4 |
| Comparative Example 3 | 92.4 | Good | 4 |
| Comparative Example 4 | 91.9 | Good | 4 |
| Comparative Example 5 | 92.4 | Good | 4 |
| Comparative Example 6 | 92.4 | Good | 4 |
| Comparative Example 7 | 91.9 | Good | 4 |
| Comparative Example 8 | 90.3 | Poor | 4 |
| Comparative Example 9 | 90.3 | Poor | 4 |
| Comparative Example 10 | 90.6 | Poor | 4 |

EXAMPLES 23 TO 42

The same procedure as defined in Example 1 was conducted except that the coating agent composition was changed to those shown in Tables 2 and 5, thereby obtaining polyester films. The properties of the thus obtained polyester films are shown in Table 6.

EXAMPLE 43

The same procedure as defined in Example 1 was conducted except that the coating agent composition used in Example 20 was changed to those shown in Table 5, thereby obtaining a polyester film. The properties of the thus obtained polyester film are shown in Table 6.

EXAMPLE 44

The same procedure as defined in Example 1 was conducted except that the coating agent composition used in Example 21 was changed to those shown in Table 5, thereby obtaining a polyester film. The properties of the thus obtained polyester film are shown in Table 6.

EXAMPLE 45

The same procedure as defined in Example 1 was conducted except that the coating agent composition used in Example 22 was changed to those shown in Table 5, thereby obtaining a polyester film. The properties of the thus obtained polyester film are shown in Table 6.

COMPARATIVE EXAMPLES 11 TO 20

The same procedure as defined in Example 1 was conducted except that the coating agent composition was changed to those shown in Tables 1, 2 and 5, thereby obtaining polyester films. As a result of evaluating properties of the thus obtained laminated polyester films, it was confirmed that as shown in Table 7 below, some of the polyester films had a poor adhesion property, and some of the polyester films failed to exhibit a minimum value of the reflectance or exhibited a high minimum value of the reflectance.

TABLE 5

| Coating solutions | Coating agent composition (wt %) | | | | | | |
|---|---|---|---|---|---|---|---|
| | IIA | IIB | IV | VA | VB | VIA | VII |
| Solution A10 | 35 | 0 | 30 | 30 | 0 | 0 | 5 |
| Solution A11 | 35 | 0 | 30 | 0 | 30 | 0 | 5 |
| Solution A12 | 0 | 30 | 30 | 25 | 0 | 10 | 5 |
| Solution A13 | 0 | 30 | 30 | 0 | 25 | 10 | 5 |
| Solution A14 | 0 | 20 | 45 | 30 | 0 | 0 | 5 |
| Solution A15 | 0 | 35 | 30 | 30 | 0 | 0 | 5 |
| Solution A16 | 0 | 15 | 35 | 45 | 0 | 0 | 5 |
| Solution A17 | 0 | 65 | 15 | 15 | 0 | 0 | 5 |
| Solution A18 | 50 | 0 | 30 | 15 | 0 | 0 | 5 |
| Solution A19 | 50 | 0 | 15 | 30 | 0 | 0 | 5 |
| Solution C9 | 95 | 0 | 0 | 0 | 0 | 0 | 5 |
| Solution C10 | 65 | 0 | 30 | 0 | 0 | 0 | 5 |
| Solution C11 | 65 | 0 | 0 | 30 | 0 | 0 | 5 |

TABLE 6

| | First coating layer | | |
|---|---|---|---|
| Examples | Coating solution | Thickness (μm) | Adhesion property 1 |
| Example 23 | A10 | 0.05 | A |
| Example 24 | A11 | 0.03 | B |
| Example 25 | A11 | 0.05 | A |

TABLE 6-continued

| Examples | Coating solution | Thickness (μm) | Adhesion property 1 |
|---|---|---|---|
| Example 26 | A11 | 0.08 | A |
| Example 27 | A12 | 0.05 | A |
| Example 28 | A13 | 0.05 | A |
| Example 29 | A14 | 0.05 | A |
| Example 30 | A15 | 0.05 | A |
| Example 31 | A16 | 0.05 | B |
| Example 32 | A17 | 0.05 | B |
| Example 33 | A18 | 0.05 | B |
| Example 34 | A19 | 0.05 | B |
| Example 35 | A10 | 0.05 | A |
| Example 36 | A10 | 0.05 | A |
| Example 37 | A10 | 0.05 | A |
| Example 38 | A10 | 0.05 | A |
| Example 39 | A10 | 0.05 | A |
| Example 40 | A10 | 0.05 | A |
| Example 41 | A10 | 0.05 | A |
| Example 42 | A10 | 0.03 | B |
| Example 43 | A10 | 0.05 | A |
| Example 44 | A10 | 0.05 | A |
| Example 45 | A10 | 0.05 | A |

| Examples | Second coating layer | | | |
|---|---|---|---|---|
| | Coating solution | Thickness (μm) | Bottom wavelength (nm) | Minimum value of absolute reflectance (%) |
| Example 23 | B1 | 0.10 | 560 | 2.5 |
| Example 24 | B1 | 0.10 | 560 | 2.5 |
| Example 25 | B1 | 0.10 | 560 | 2.5 |
| Example 26 | B1 | 0.10 | 560 | 2.5 |
| Example 27 | B1 | 0.10 | 560 | 2.5 |
| Example 28 | B1 | 0.10 | 560 | 2.5 |
| Example 29 | B1 | 0.10 | 560 | 2.5 |
| Example 30 | B1 | 0.10 | 560 | 2.5 |
| Example 31 | B1 | 0.10 | 560 | 2.5 |
| Example 32 | B1 | 0.10 | 560 | 2.5 |
| Example 33 | B1 | 0.10 | 560 | 2.5 |
| Example 34 | B1 | 0.10 | 560 | 2.5 |
| Example 35 | B2 | 0.10 | 530 | 2.1 |
| Example 36 | B3 | 0.10 | 540 | 2.9 |
| Example 37 | B4 | 0.10 | 540 | 2.9 |
| Example 38 | B1 | 0.06 | 340 | 3.1 |
| Example 39 | B1 | 0.08 | 440 | 2.6 |
| Example 40 | B1 | 0.12 | 640 | 2.5 |
| Example 41 | B1 | 0.14 | 770 | 2.5 |
| Example 42 | B1 | 0.06 | 340 | 3.1 |
| Example 43 | B1 | 0.10 | 560 | 2.5 |
| Example 44 | B1 | 0.10 | 560 | 2.5 |
| Example 45 | B1 | 0.10 | 560 | 2.5 |

| Examples | Total light transmittance (%) | Total light transmittance of polarizing plate | Transmittance at 380 nm (%) |
|---|---|---|---|
| Example 23 | 92.4 | Good | 4 |
| Example 24 | 91.8 | Good | 4 |
| Example 25 | 92.4 | Good | 4 |
| Example 26 | 93.5 | Good | 4 |
| Example 27 | 92.3 | Good | 4 |
| Example 28 | 92.3 | Good | 4 |
| Example 29 | 92.4 | Good | 4 |
| Example 30 | 92.4 | Good | 4 |
| Example 31 | 92.4 | Good | 4 |
| Example 32 | 92.4 | Good | 4 |
| Example 33 | 92.4 | Good | 4 |
| Example 34 | 92.4 | Good | 4 |
| Example 35 | 92.9 | Good | 4 |
| Example 36 | 91.9 | Good | 4 |
| Example 37 | 91.9 | Good | 4 |
| Example 38 | 91.4 | Good | 4 |
| Example 39 | 92.2 | Good | 4 |
| Example 40 | 92.1 | Good | 4 |
| Example 41 | 91.4 | Good | 4 |
| Example 42 | 90.8 | Good | 4 |
| Example 43 | 92.4 | Good | 1 |
| Example 44 | 92.4 | Good | 9 |
| Example 45 | 92.4 | Good | 88 |

TABLE 7

| Comparative Examples | First coating layer | | |
|---|---|---|---|
| | Coating solution | Thickness (μm) | Adhesion property 1 |
| Comparative Example 11 | C9 | 0.05 | D |
| Comparative Example 12 | C2 | 0.05 | D |
| Comparative Example 13 | C3 | 0.05 | D |
| Comparative Example 14 | C10 | 0.05 | C |
| Comparative Example 15 | C5 | 0.05 | D |
| Comparative Example 16 | C6 | 0.05 | C |
| Comparative Example 17 | C11 | 0.05 | D |
| Comparative Example 18 | A10 | 0.05 | A |
| Comparative Example 19 | A10 | 0.05 | A |
| Comparative Example 20 | A10 | 0.05 | A |

| Comparative Examples | Second coating layer | | | |
|---|---|---|---|---|
| | Coating solution | Thickness (μm) | Bottom wavelength (nm) | Minimum value of absolute reflectance (%) |
| Comparative Example 11 | B1 | 0.10 | 560 | 2.5 |
| Comparative Example 12 | B1 | 0.10 | 560 | 2.5 |
| Comparative Example 13 | B1 | 0.10 | 560 | 2.5 |
| Comparative Example 14 | B1 | 0.10 | 560 | 2.5 |
| Comparative Example 15 | B1 | 0.10 | 560 | 2.5 |
| Comparative Example 16 | B1 | 0.10 | 560 | 2.5 |
| Comparative Example 17 | B1 | 0.10 | 560 | 2.5 |
| Comparative Example 18 | B1 | 0.03 | None | None |
| Comparative Example 19 | B1 | 0.17 | None | None |
| Comparative Example 20 | C8 | 0.10 | 520 | 3.7 |

| Comparative Examples | Total light transmittance (%) | Total light transmittance of polarizing plate | Transmittance at 380 nm (%) |
|---|---|---|---|
| Comparative Example 11 | 92.4 | Good | 4 |
| Comparative Example 12 | 92.4 | Good | 4 |
| Comparative Example 13 | 92.4 | Good | 4 |
| Comparative Example 14 | 92.4 | Good | 4 |
| Comparative Example 15 | 92.4 | Good | 4 |
| Comparative Example 16 | 92.4 | Good | 4 |

TABLE 7-continued

| | | | |
|---|---|---|---|
| Comparative Example 17 | 92.4 | Good | 4 |
| Comparative Example 18 | 90.6 | Poor | 4 |
| Comparative Example 19 | 90.6 | Poor | 4 |
| Comparative Example 20 | 90.9 | Poor | 4 |

EXAMPLES 46 TO 67

The same procedure as defined in Example 1 was conducted except that the coating agent composition was changed to those shown in Tables 2 and 8, thereby obtaining polyester films. The properties of the thus obtained polyester films are shown in Table 9.

EXAMPLE 68

The same procedure as defined in Example 1 was conducted except that the coating agent composition used in Example 20 was changed to those shown in Tables 2 and 8, thereby obtaining a polyester film. The properties of the thus obtained polyester film are shown in Table 9.

EXAMPLE 69

The same procedure as defined in Example 1 was conducted except that the coating agent composition used in Example 21 was changed to those shown in Tables 2 and 8, thereby obtaining a polyester film. The properties of the thus obtained polyester film are shown in Table 9.

EXAMPLE 70

The same procedure as defined in Example 1 was conducted except that the coating agent composition used in Example 22 was changed to those shown in Tables 2 and 8, thereby obtaining a polyester film. The properties of the thus obtained polyester film are shown in Table 9.

COMPARATIVE EXAMPLES 21 TO 26

The same procedure as defined in Example 1 was conducted except that the coating agent composition was changed to those shown in Tables 2 and 8, thereby obtaining polyester films. As a result of evaluating properties of the thus obtained laminated polyester films, it was confirmed that as shown in Table 10 below, some of the polyester films had a poor adhesion property, and some of the polyester films failed to exhibit a minimum value of the reflectance or exhibited a high minimum value of the reflectance.

TABLE 8

| Coating solutions | Coating agent composition (wt %) | | | | | | | |
|---|---|---|---|---|---|---|---|---|
| | IIIA | IIIB | IIIC | IV | VA | VB | VIA | VII |
| Solution A20 | 35 | 0 | 0 | 30 | 30 | 0 | 0 | 5 |
| Solution A21 | 35 | 0 | 0 | 30 | 0 | 30 | 0 | 5 |
| Solution A22 | 30 | 0 | 0 | 30 | 25 | 0 | 10 | 5 |
| Solution A23 | 30 | 0 | 0 | 30 | 0 | 25 | 10 | 5 |
| Solution A24 | 20 | 0 | 0 | 45 | 30 | 0 | 0 | 5 |
| Solution A25 | 20 | 0 | 0 | 30 | 45 | 0 | 0 | 5 |
| Solution A26 | 50 | 0 | 0 | 23 | 22 | 0 | 0 | 5 |
| Solution A27 | 0 | 20 | 0 | 45 | 30 | 0 | 0 | 5 |

TABLE 8-continued

| Coating solutions | Coating agent composition (wt %) | | | | | | | |
|---|---|---|---|---|---|---|---|---|
| | IIIA | IIIB | IIIC | IV | VA | VB | VIA | VII |
| Solution A28 | 0 | 35 | 0 | 40 | 20 | 0 | 0 | 5 |
| Solution A29 | 65 | 0 | 0 | 15 | 15 | 0 | 0 | 5 |
| Solution A30 | 75 | 0 | 0 | 10 | 10 | 0 | 0 | 5 |
| Solution A31 | 0 | 0 | 35 | 30 | 15 | 0 | 15 | 5 |
| Solution C12 | 95 | 0 | 0 | 0 | 0 | 0 | 0 | 5 |
| Solution C13 | 65 | 0 | 0 | 30 | 0 | 0 | 0 | 5 |
| Solution C14 | 65 | 0 | 0 | 0 | 30 | 0 | 0 | 5 |

TABLE 9

| | First coating layer | | |
|---|---|---|---|
| Examples | Coating solution | Thickness (μm) | Adhesion property 1 |
| Example 46 | A20 | 0.05 | A |
| Example 47 | A21 | 0.03 | B |
| Example 48 | A21 | 0.05 | A |
| Example 49 | A21 | 0.08 | A |
| Example 50 | A22 | 0.05 | A |
| Example 51 | A23 | 0.05 | A |
| Example 52 | A24 | 0.05 | A |
| Example 53 | A25 | 0.05 | A |
| Example 54 | A26 | 0.05 | A |
| Example 55 | A27 | 0.05 | A |
| Example 56 | A28 | 0.05 | A |
| Example 57 | A29 | 0.05 | B |
| Example 58 | A30 | 0.05 | B |
| Example 59 | A31 | 0.05 | B |
| Example 60 | A20 | 0.05 | A |
| Example 61 | A20 | 0.05 | A |
| Example 62 | A20 | 0.05 | A |
| Example 63 | A20 | 0.05 | A |
| Example 64 | A20 | 0.05 | A |
| Example 65 | A20 | 0.05 | A |
| Example 66 | A20 | 0.05 | A |
| Example 67 | A20 | 0.03 | B |
| Example 68 | A20 | 0.05 | A |
| Example 69 | A20 | 0.05 | A |
| Example 70 | A20 | 0.05 | A |

| | Second coating layer | | | |
|---|---|---|---|---|
| Examples | Coating solution | Thickness (μm) | Bottom wavelength (nm) | Minimum value of absolute reflectance (%) |
| Example 46 | B1 | 0.10 | 560 | 2.5 |
| Example 47 | B1 | 0.10 | 560 | 2.5 |
| Example 48 | B1 | 0.10 | 560 | 2.5 |
| Example 49 | B1 | 0.10 | 560 | 2.5 |
| Example 50 | B1 | 0.10 | 560 | 2.5 |
| Example 51 | B1 | 0.10 | 560 | 2.5 |
| Example 52 | B1 | 0.10 | 560 | 2.5 |
| Example 53 | B1 | 0.10 | 560 | 2.5 |
| Example 54 | B1 | 0.10 | 560 | 2.5 |
| Example 55 | B1 | 0.10 | 560 | 2.5 |
| Example 56 | B1 | 0.10 | 560 | 2.5 |
| Example 57 | B1 | 0.10 | 560 | 2.5 |
| Example 58 | B1 | 0.10 | 560 | 2.5 |
| Example 59 | B1 | 0.10 | 560 | 2.5 |
| Example 60 | B2 | 0.10 | 530 | 2.1 |
| Example 61 | B3 | 0.10 | 540 | 2.9 |
| Example 62 | B4 | 0.10 | 540 | 2.9 |
| Example 63 | B1 | 0.06 | 340 | 3.1 |
| Example 64 | B1 | 0.08 | 440 | 2.6 |
| Example 65 | B1 | 0.12 | 640 | 2.5 |
| Example 66 | B1 | 0.14 | 770 | 2.5 |
| Example 67 | B1 | 0.06 | 340 | 3.1 |
| Example 68 | B1 | 0.10 | 560 | 2.5 |

TABLE 9-continued

| Examples | | | | |
|---|---|---|---|---|
| Example 69 | B1 | 0.10 | 560 | 2.5 |
| Example 70 | B1 | 0.10 | 560 | 2.5 |

| Examples | Total light transmittance (%) | Total light transmittance of polarizing plate | Transmittance at 380 nm (%) |
|---|---|---|---|
| Example 46 | 92.4 | Good | 4 |
| Example 47 | 91.8 | Good | 4 |
| Example 48 | 92.4 | Good | 4 |
| Example 49 | 93.5 | Good | 4 |
| Example 50 | 92.3 | Good | 4 |
| Example 51 | 92.3 | Good | 4 |
| Example 52 | 92.4 | Good | 4 |
| Example 53 | 92.4 | Good | 4 |
| Example 54 | 92.4 | Good | 4 |
| Example 55 | 92.4 | Good | 4 |
| Example 56 | 92.4 | Good | 4 |
| Example 57 | 92.4 | Good | 4 |
| Example 58 | 92.4 | Good | 4 |
| Example 59 | 92.1 | Good | 4 |
| Example 60 | 92.9 | Good | 4 |
| Example 61 | 91.9 | Good | 4 |
| Example 62 | 91.9 | Good | 4 |
| Example 63 | 91.4 | Good | 4 |
| Example 64 | 92.2 | Good | 4 |
| Example 65 | 92.1 | Good | 4 |
| Example 66 | 91.4 | Good | 4 |
| Example 67 | 90.8 | Good | 4 |
| Example 68 | 92.4 | Good | 1 |
| Example 69 | 92.4 | Good | 9 |
| Example 70 | 92.4 | Good | 88 |

TABLE 10

| | First coating layer | | | |
|---|---|---|---|---|
| Comparative Examples | Coating solution | Thickness (μm) | Adhesion property 1 | |
| Comparative Example 21 | C12 | 0.05 | D | |
| Comparative Example 22 | C13 | 0.05 | C | |
| Comparative Example 23 | C14 | 0.05 | C | |
| Comparative Example 24 | A20 | 0.05 | A | |
| Comparative Example 25 | A20 | 0.05 | A | |
| Comparative Example 26 | A20 | 0.05 | A | |

| | Second coating layer | | | |
|---|---|---|---|---|
| Comparative Examples | Coating solution | Thickness (μm) | Bottom wavelength (nm) | Minimum value of absolute reflectance (%) |
| Comparative Example 21 | B1 | 0.10 | 560 | 2.5 |
| Comparative Example 22 | B1 | 0.10 | 560 | 2.5 |
| Comparative Example 23 | B1 | 0.10 | 560 | 2.5 |
| Comparative Example 24 | B1 | 0.03 | None | None |
| Comparative Example 25 | B1 | 0.17 | None | None |
| Comparative Example 26 | C8 | 0.10 | 520 | 3.7 |

TABLE 10-continued

| Comparative Examples | Total light transmittance (%) | Total light transmittance of polarizing plate | Transmittance at 380 nm (%) |
|---|---|---|---|
| Comparative Example 21 | 92.4 | Good | 4 |
| Comparative Example 22 | 92.4 | Good | 4 |
| Comparative Example 23 | 92.4 | Good | 4 |
| Comparative Example 24 | 90.6 | Poor | 4 |
| Comparative Example 25 | 90.6 | Poor | 4 |
| Comparative Example 26 | 90.9 | Poor | 4 |

INDUSTRIAL APPLICABILITY

The film of the present invention can be suitably used in the applications in which a good adhesion property to various adhesives and a high total light transmittance after being processed are required, for example, such as a protective film for a polarizing film used in liquid crystal displays, in particular, a protective film for a rear surface of a rear side polarizing plate or the like.

The invention claimed is:

1. A laminated polyester film comprising
a polyester film;
a first coating layer formed by applying a coating solution which comprises polyvinyl alcohol, an oxazoline compound and at least one resin selected from the group consisting of a polyester resin, an acrylic resin and a urethane resin on one surface of the polyester film; and
a second coating layer formed on the other surface of the polyester film which has an absolute reflectance exhibiting one minimum value in a wavelength range of 300 to 800 nm, which minimum value is not more than 3.5%;
wherein the first coating layer has a thickness of 0.002 to 1.0 μm, and the second coating layer has a thickness of 0.04 to 0.15 μm.

2. A laminated polyester film according to claim 1, wherein a content of the polyester resin, acrylic resin or urethane resin in the first coating layer is 20 to 40% by weight; a content of the polyvinyl alcohol in the first coating layer is 20 to 50% by weight; and a content of the oxazoline compound in the first coating layer is 20-40% by weight.

3. A laminated polyester film according to claim 1, wherein a weight ratio of the polyester resin, acrylic resin or urethane resin:polyvinyl alcohol:oxazoline compound in the first coating layer is in the range of 1.0 to 8.0:1.0 to 8.0:1.0 to 8.0.

4. A laminated polyester film according to claim 1, wherein the urethane resin used in the first coating layer is produced by using polycarbonate polyols as a polyol.

5. A laminated polyester film according to claim 1, wherein the oxazoline compound used in the first coating layer is a polymer having an oxazoline group on a side chain thereof.

6. A laminated polyester film according to claim 1, wherein the first coating layer further comprises a melamine compound and/or an epoxy compound.

7. A laminated polyester film according to claim 6, wherein a content of the melamine compound and/or the epoxy compound in the first coating layer is 3 to 50% by weight based on a total amount of the at least one resin selected from the group consisting of the polyester resin, the acrylic resin and the urethane resin, the polyvinyl alcohol and the oxazoline compound.

8. A laminated polyester film according to claim 6, wherein the melamine compound is an alkylated melamine compound.

9. A laminated polyester film according to claim 8, wherein the alkylated melamine compound is a completely alkylated melamine compound.

10. A laminated polyester film according to claim 9, wherein the completely alkylated melamine compound is hexamethoxymethyl melamine.

11. A laminated polyester film according to claim 6, wherein the epoxy compound is a polyfunctional epoxy compound.

12. A laminated polyester film according to claim 11, wherein the polyfunctional epoxy compound is a compound having at least two glycidyl ether structures.

13. A laminated polyester film according to claim 12, wherein the compound having at least two glycidyl ether structures is a polyglycerol polyglycidyl ether.

14. A laminated polyester film according to claim 1, wherein the second coating layer comprises an acrylic resin and/or a urethane resin.

15. A laminated polyester film according to claim 14, wherein a content of the acrylic resin and/or the urethane resin in the second coating layer is not less than 40% by weight.

16. A laminated polyester film according to claim 14, wherein the urethane resin in the second coating layer is produced by using polycarbonate polyols as a polyol.

17. A laminated polyester film according to claim 1, wherein the polyester film comprises an ultraviolet absorber.

18. A laminated polyester film comprising
a polyester film;
a first coating layer formed by applying a coating solution which comprises polyvinyl alcohol, an oxazoline compound and at least one resin selected from the group consisting of a polyester resin, an acrylic resin, a urethane resin and an alkylated melamine compound on one surface of the polyester film; and
a second coating layer formed on the other surface of the polyester film which has an absolute reflectance exhibiting one minimum value in a wavelength range of 300 to 800 nm, which minimum value is not more than 3.5%;
wherein the first coating layer has a thickness of 0.002 to 1.0 μm, and the second coating layer has a thickness of 0.04 to 0.15 μm.

19. A laminated polyester film comprising
a polyester film;
a first coating layer formed by applying a coating solution which comprises polyvinyl alcohol, an oxazoline compound and at least one resin selected from the group consisting of a polyester resin, an acrylic resin, a urethane resin and a polyfunctional epoxy compound having at least two glycidyl ether structures on one surface of the polyester film; and
a second coating layer formed on the other surface of the polyester film which has an absolute reflectance exhibiting one minimum value in a wavelength range of 300 to 800 nm, which minimum value is not more than 3.5%;
wherein the first coating layer has a thickness of 0.002 to 1.0 μm, and the second coating layer has a thickness of 0.04 to 0.15 μm.

* * * * *